United States Patent
Chen et al.

(10) Patent No.: US 11,922,710 B2
(45) Date of Patent: Mar. 5, 2024

(54) CHARACTER RECOGNITION METHOD, CHARACTER RECOGNITION DEVICE AND NON-TRANSITORY COMPUTER READABLE MEDIUM

(71) Applicant: Realtek Semiconductor Corporation, Hsinchu (TW)

(72) Inventors: Chien-Hao Chen, Hsinchu (TW); Chao-Hsun Yang, Hsinchu (TW); Shih-Tse Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 17/659,656

(22) Filed: Apr. 18, 2022

(65) Prior Publication Data

US 2023/0112822 A1    Apr. 13, 2023

(30) Foreign Application Priority Data

Oct. 8, 2021    (TW) ................. 110137643

(51) Int. Cl.
  *G06V 30/19*    (2022.01)
  *G06V 30/18*    (2022.01)
  *G06V 30/182*   (2022.01)

(52) U.S. Cl.
  CPC .. *G06V 30/19073* (2022.01); *G06V 30/18019* (2022.01); *G06V 30/1823* (2022.01)

(58) Field of Classification Search
  CPC ....... G06V 30/19073; G06V 30/18019; G06V 30/1823
  See application file for complete search history.

(56) References Cited

U.S. PATENT DOCUMENTS

2012/0014562 A1*  1/2012  Berkovich ........... G06V 40/161
                                                    382/103

FOREIGN PATENT DOCUMENTS

| CN | 109190444 | A | * | 1/2019 | ......... G06K 9/00825 |
| CN | 110517293 | A |   | 11/2019 |                       |
| CN | 107958220 | B | * | 3/2021 | ......... G06K 9/00228 |
| CN | 111079720 | B | * | 4/2022 | ......... G06K 9/00228 |

OTHER PUBLICATIONS

Nicolai Wojke et al., "Simple online and realtime tracking with a deep association metric." 2017 IEEE international conference on image processing (ICIP). Mar. 21, 2017.

* cited by examiner

*Primary Examiner* — Wednel Cadeau
(74) *Attorney, Agent, or Firm* — CKC & Partners Co., LLC (57) ABSTRACT

A character recognition method includes the following operations: determining that the image of character to be identified corresponds to a matching character of several registered characters according to several vector distances to be identified between a vector of an image of character to be identified and several vectors of several registered character images of several registered characters, and storing a matching vector distance between the vector of the image of character to be identified and a vector of the matching character by a processor; and storing a data of the matching character according to the image of character to be identified when the matching vector distance is less than a vector distance threshold by the processor.

14 Claims, 6 Drawing Sheets

CHARACTER RECOGNITION METHOD, CHARACTER RECOGNITION DEVICE AND NON-TRANSITORY COMPUTER READABLE MEDIUM

CROSS-REFERENCE TO RELATED APPLICATION

This application claims the priority benefit of TAIWAN Application Ser. No. 110137643, filed Oct. 8, 2021, the full disclosure of which is incorporated herein by reference.

FIELD OF INVENTION

The invention relates to a character recognition method, a character recognition device, and a non-transitory computer readable medium. More particularly, the invention relates to a character recognition method, a character recognition device, and a non-transitory computer readable medium for updating the data library and performing the character recognition at the same time.

BACKGROUND

Character recognition (or humanoid recognition, face recognition) is mainly composed of two parts. In practical applications, when the data library is compared, the character of the unknown identity can be automatically registered, and the identity name can be replaced by the serial number. If the character identity that appears on the screen has been registered in the data library, the character information (character vector) is updated to the data library. Therefore, when comparing the data library, the data library will also be read and written at the same time.

SUMMARY

An aspect of this disclosure is to provide a character recognition method. The character recognition method includes the following operations: determining that the image of character to be identified corresponds to a matching character of several registered characters according to several vector distances to be identified between a vector of an image of character to be identified and several vectors of several registered character images of several registered characters, and storing a matching vector distance between the vector of the image of character to be identified and a vector of the matching character by a processor; and storing a data of the matching character according to the image of character to be identified when the matching vector distance is less than a vector distance threshold by the processor.

Another aspect of this disclosure is to provide a character recognition device. The character recognition device includes a memory and a processor. The memory is configured to store data of several registered characters. The processor is coupled to the memory, and the processor is configured to determine that the image of character to be identified corresponds to a matching character of several registered characters according to several vector distances to be identified between a vector of an image of character to be identified and several vectors of several registered character images of several registered characters, and configured to store a matching vector distance between the vector of the image of character to be identified and a vector of the matching character, and configured to update a data of the matching character according to the image of character to be identified by the processor when the matching vector distance is less than a vector distance threshold.

Another aspect of this disclosure is to provide a non-transitory computer readable medium. The non-transitory computer readable medium is configured to store a computer software and to perform a character recognition method, the character recognition method includes the following operations: according to several vector distances to be identified between a vector of an image of character to be identified and several vectors of several registered character images of several registered characters, determining that the image of character to be identified corresponds to a matching character of several registered characters, and storing a matching vector distance between the vector of the image of character to be identified and a vector of the matching character; and when the matching vector distance is less than a vector distance threshold, updating a data of the matching character according to the image of character to be identified.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

The term "coupled" as used herein may also refer to "electrically coupled", and the term "connected" may also refer to "electrically connected". "Coupled" and "connected" may also refer to Refers to two or several elements cooperating or interacting with each other.

Figure 1:
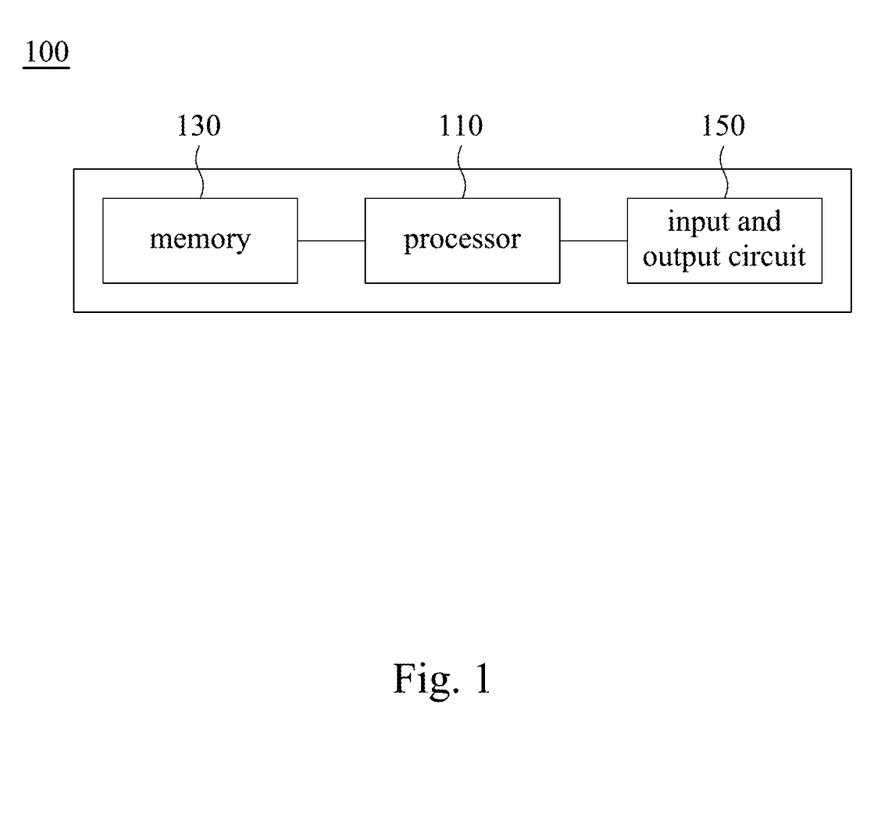
FIG. 1 is a schematic diagram of a character recognition device.

Reference is made to FIG. 1. FIG. 1 is a schematic diagram of a character recognition device 100. As illustrated in FIG. 1, the character recognition device 100 includes the processor 110 and the memory 130. The processor 110 is coupled to the memory 130. In some embodiments, the character recognition device 100 further comprises the input and output circuit 150. The input and output circuit 150 is coupled to the processor 110. In some embodiments, the input and output circuit 150 is a camera.

Figure 2:
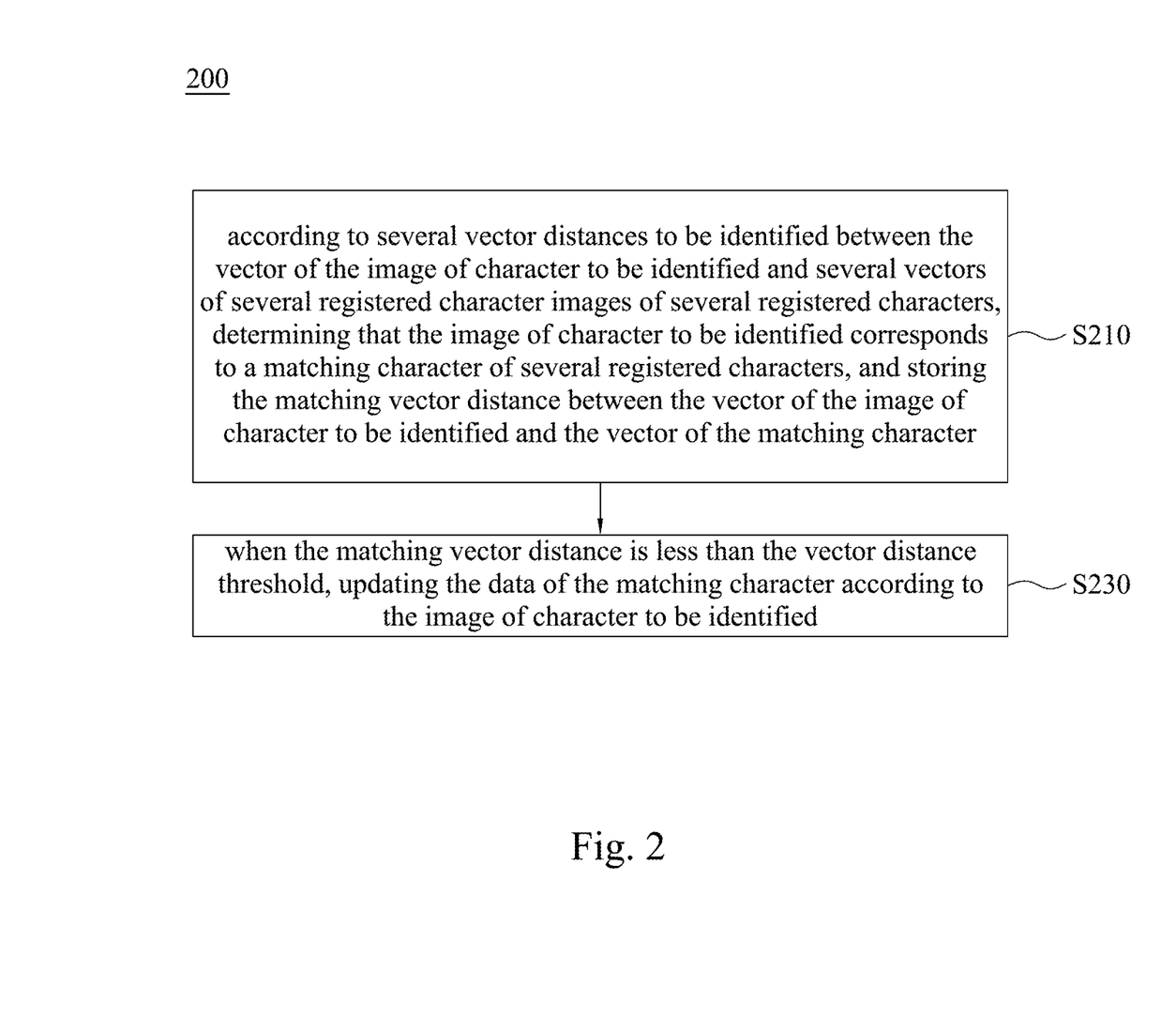
FIG. 2 is a schematic diagram of a character recognition method according to some embodiments of the present disclosure.

Reference is made to FIG. 2. FIG. 2 is a schematic diagram of a character recognition method 200 according to some embodiments of the present disclosure. The embodiments of the present disclosure are not limited thereto.

It should be noted that, the character recognition method 200 can be applied to a system with the same or similar structure as the character recognition device 100 in FIG. 1. To make the description simple, the following takes FIG. 2 as an example to describe the operation method, but the present disclosure is not limited to the application of FIG. 1.

It should be noted that, in some embodiments, the character recognition method 200 can also be implemented as a computer program and stored in a non-transitory computer readable medium, so that a computer, an electronic device, or the processor 110 in the aforementioned character recognition device 100 as shown in FIG. 1 can read the recording medium and performs the operation method. The processor 110 may be composed of one or more chips. The non-transitory computer-readable recording medium can be read-only memory, flash memory, floppy disk, hard disk, optical disk, pen disk, magnetic tape, or a data base that can be accessed over a network, or an non-transitory computer-readable recording media those skilled in the art can easily think of with the same function.

In addition, it should be understood that the operation of the character recognition method 200 mentioned in the present embodiment, except for those who specifically describe its sequence, can adjust its sequence before and after according to actual needs, and even can be implemented simultaneously or partially at the same time.

Furthermore, in different embodiments, these operations can also be adaptively added, replaced, and/or omitted.

Reference is made to FIG. 2. The character recognition method 200 includes operations S210 to S230.

In operation S210, according to several vector distances to be identified between the vector of the image of character to be identified and several vectors of several registered character images of several registered characters, the image of character to be identified corresponds to a matching character of several registered characters is determined, and matching vector distance between the vector of the image of character to be identified and the vector of the matching character is stored.

Reference is made to FIG. 1 together. In some embodiments, operation S210 may be performed by the processor 110 as shown in FIG. 1. For the detailed operation method of operation S210, reference is made to FIG. 1, FIG. 3 to FIG. 4 together.

Figure 3:
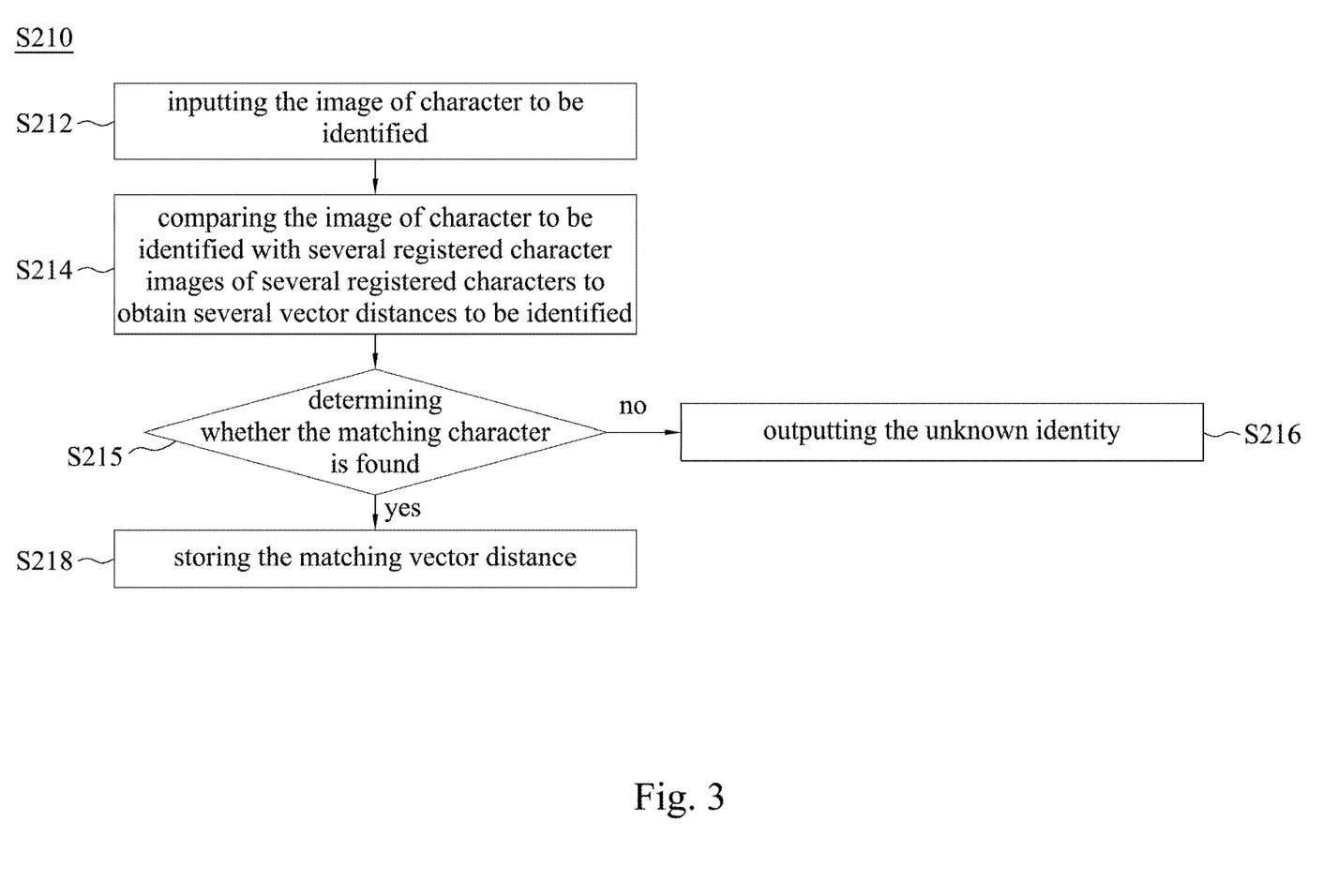
FIG. 3 is a schematic diagram of an operation of the character recognition method in FIG. 2 according to some embodiments of the present disclosure.

Reference is made to FIG. 3. FIG. 3 is a schematic diagram of operation S210 of the character recognition method 200 in FIG. 2 according to some embodiments of the present disclosure. As illustrated in FIG. 3, operation S210 includes operation S212 to operation S218.

In operation S212, the image of character to be identified is inputted.

Figure 4:
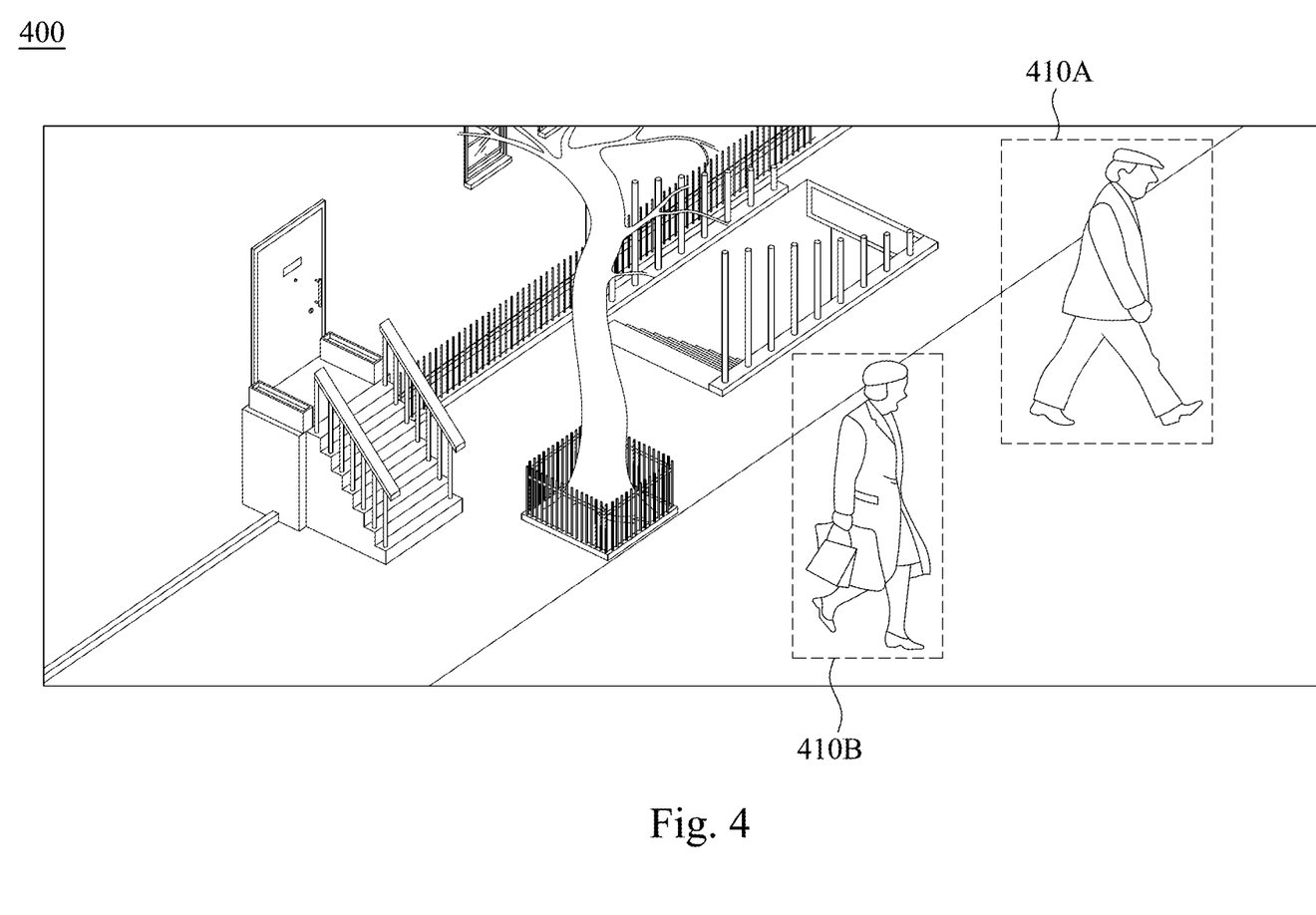
FIG. 4 is a schematic diagram of a frame of image obtained by the input and output circuit in FIG. 1 according to some embodiments of the present disclosure.

Reference is made to FIG. 4. FIG. 4 is a schematic diagram of a frame of image 400 obtained by the input and output circuit 150 in FIG. 1 according to some embodiments of the present disclosure. It should be noted that, the image 400 shown in FIG. 4 is a frame image in a continuous image. The continuous images may be obtained by the input and output circuit 150. For example, a camera. The processor 110 obtains the image of character to be identified 410A from the image 400. In some embodiments, the image 400 may contain several character images of different characters. For example, image 400 may further include an image of character to be identified 410B of character B to be identified.

In operation S214, the image of character to be identified is compared with several registered character images of several registered characters to obtain several vector distances to be identified.

For example, after the processor 110 obtains the image of character to be identified 410A from the image 400, the vector $\overrightarrow{test}$ of the image of character to be identified 410A is calculated. Suppose that the memory 130 stores a vector of registered character images of several registered characters that have been registered in the data library (not shown), including the vector $\vec{a}$ of the registered character A, the vector $\vec{b}$ of the registered character B, and the vector $\vec{c}$ of the registered character C. The processor 110 calculates the vector distance to be identified ad between the vector test of the image of character to be identified 410A and the vector a of the registered character, the vector distance to be identified bd between the vector $\overrightarrow{test}$ of the image of character to be identified 410A and the vector $\vec{b}$ of the registered character B, and the vector distance to be identified cd between the vector test of the image of character to be identified 410A and the vector $\vec{c}$ of the registered character C.

In operation S215, whether the matching character is found is determined.

Continuing the above example, if the processor 110 determines that the smallest one in the vector distances to be identified ad, bd, and cd is ad, and if the vector distance to be identified ad is less than the identification threshold, the processor 110 determines that the matching identity is found to be the character A, and operation S218 is operated. On the other hand, if the processor 110 determines that the smallest one in the vector distances to be identified ad, bd, and cd is ad, and if the vector distance to be identified ad is not less than the identification threshold, the processor 110 determines that no matching character is found, and the operation S216 is operated.

In operation S216, the unknown identity is outputted. In some embodiments, the unknown identity output by the processor 110 is a serial number character. In some embodiments, if it is determined in operation S215 that no matching character is found, the processor 110 determines that the image of character to be identified 410A does not correspond to any one of the registered characters, and the processor 110 determines that it is unknown identity.

When it is determined as unknown identity, operation S230 in FIG. 2 is not operated.

In operation S218, the matching vector distance is stored. For example, if the processor 110 determines that the matching character is the registered character A, the processor 110 records the vector distance to be identified ad, and the processor 110 performs operation S230 in FIG. 2.

In some embodiments, the operation S210 in FIG. 2 is performed in a neural network. That is, the several vector distances to be identified between the vector of the image of character to be identified and the vector of the registered character image of the registered character is calculated through the neural network, and whether the image of character to be identified corresponds to the matching character in several registered characters is also determined through the neural network.

Reference is made to FIG. 2 again. In operation S230, when the matching vector distance is less than the vector distance threshold, the data of the matching character is updated according to image of character to be identified. For easier understanding, reference is made to FIG. 1, FIG. 5 and FIG. 6 for explanation in the following.

Figure 5:
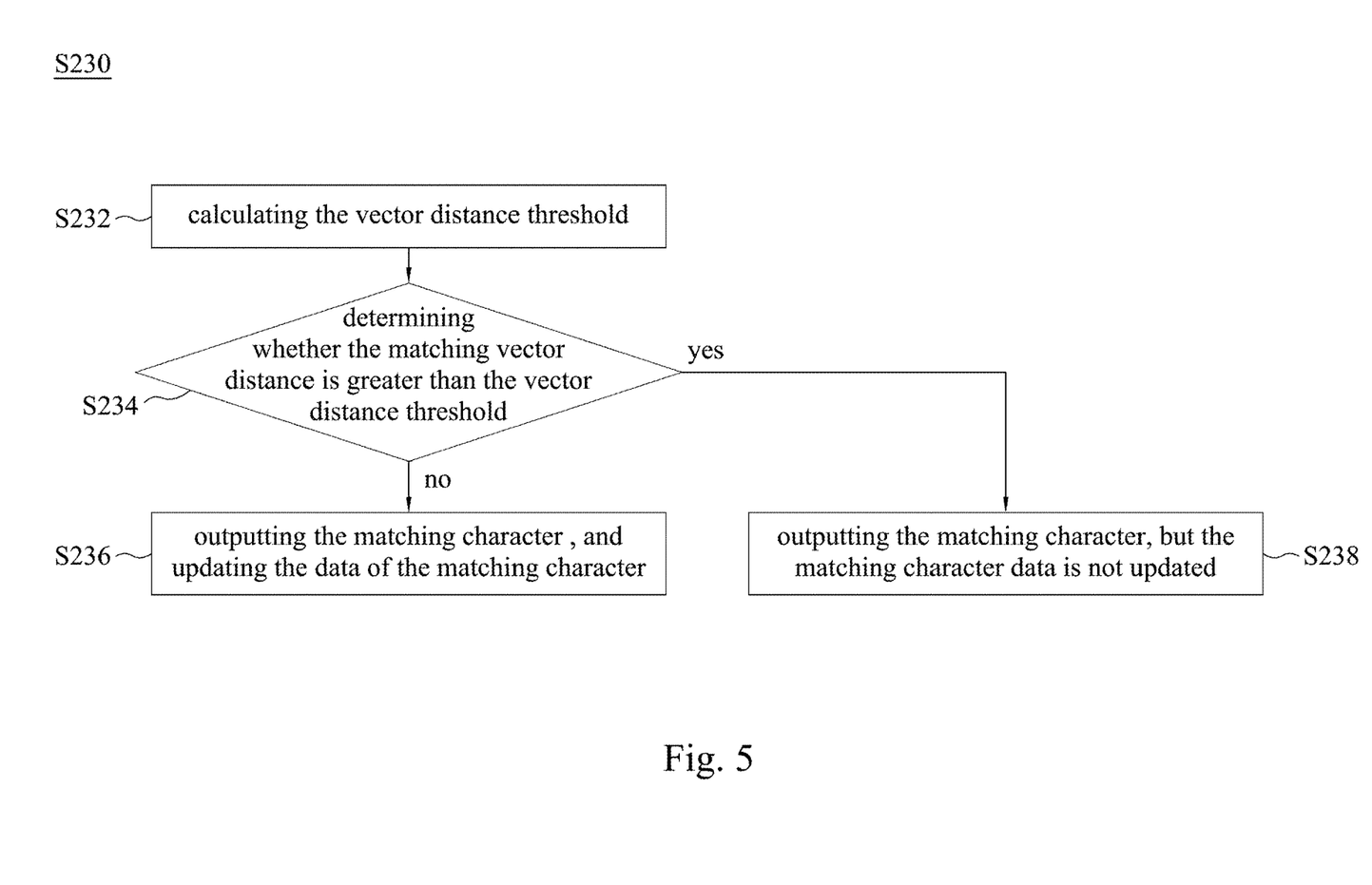
FIG. 5 is a schematic diagram of an operation of the character recognition method in FIG. 2 according to some embodiments of the present disclosure.

Reference is made to FIG. 5. FIG. 5 is a schematic diagram of operation S230 of the character recognition method 200 in FIG. 2 according to some embodiments of the present disclosure. As shown in FIG. 5, operation S230 includes operation S232 to operation S238.

In operation S232, the vector distance threshold is calculated.

In some embodiments, the vector distance threshold is calculated from several historical vector distances of several historical character images according to the matching character. In detail, the processor 110 calculates the average value of several historical vector distances and multiplies the calculated average value by a parameter to generate a vector distance threshold.

Figure 6:
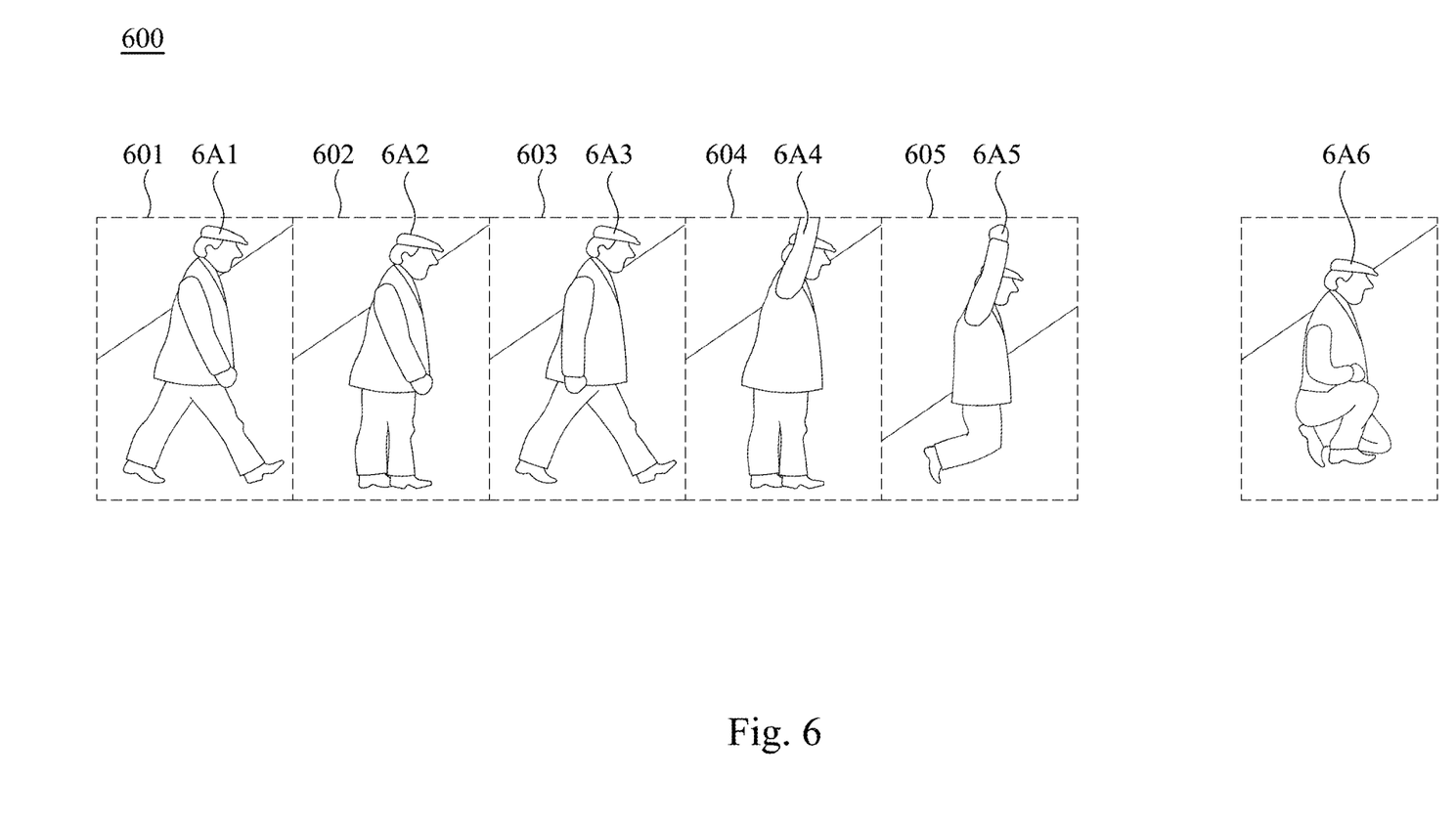
FIG. 6 is a schematic diagram of data corresponding to the matching character according to some embodiments of the present disclosure.

Reference is made to FIG. 6. FIG. 6 is a schematic diagram of data 600 corresponding to the matching character A according to some embodiments of the present disclosure. The following is an example of using the moving average algorithm to 5 historical vector distances. In the following description, since in operation S210, the image of character to be identified has been identified to be corresponding to the matching character, the character image is used to replace the image of character to be identified for description.

For example, it is assumed that the processor 110 obtains the character image 6A1 of the first frame of the matching character A at time point T1, the character image 6A2 of the second frame of the matching character A at time point T2, the character image 6A3 of the third frame of the matching character A at time point T3, the character image 6A4 of the fourth frame of the matching character A at time point T4, and the character image 6A5 of the fifth frame of the matching character A at time point T5. Since matching character A has not obtained five historical character images before obtaining the character image of the fifth frame, character images 6A1 to 6A5 and their corresponding vectors and matching vector distance are stored in storage spaces 601 to 605 respectively as historical character image vector and historical vector distance of the matching characters A.

After the processor 110 obtains the character image 6A6 of the sixth frame of the matching character A at time point T6, the processor 110 calculates the vector distance threshold according to the historical vector distances corresponding to the historical character images 6A1 to 6A5, so as to compare the matching vector distance of the character image 6A6 with the vector distance threshold.

Assume that the historical vector distances of the historical character images 6A1 to 6A5 are dd1 to dd5. After the processor 110 calculates the average of the historical vector distance dd1 to dd5, the average is multiplied by a parameter as the vector distance threshold.

In some embodiments, the parameter is 2. However, the embodiments of the present disclosure are not limited thereto. The less the value of the parameter is, the stricter the update condition of the data library is, and the larger the value of parameter is, the looser the update condition of the data library is.

In operation S234, whether the matching vector distance is greater than the vector distance threshold is determined. For example, after obtaining the character image 6A6 of the sixth frame of the matching character A at time point T6, the processor 110 compares the matching vector distance of the character image 6A6 with the vector distance threshold.

In operation S236, the matching character is outputted, and the data of the matching character is updated. For example, when the processor 110 determines that the matching vector distance of the character image 6A6 is less than the vector distance threshold, the processor 110 outputs the message that the character image 6A6 corresponds to the matching character A via the input and output circuit 150, and the processor 110 updates and stores the matching character data of matching character A in the storage spaces 601 to 605.

In some embodiments, when updating the matching character data, it is updated on a first-in, first-out basis. However, the embodiments of the present disclosure are not limited thereto. For example, when updating is performed in a first-in, first-out manner, the processor 110 stores the character image 6A6 and its corresponding vector and the matching vector distance in the storage space 601 as the historical character image and the historical vector distance of the matching character A. At this time, the historical vector distance corresponding to the matching character A stored in the data library is updated from the original historical vector distance of character images 6A1 to 6A5 to the historical vector distance of character images 6A2 to 6A6.

In this case, when the processor 110 obtains the character image of the seventh frame (not drawn) of the matching character A at time point T7, the processor 110 calculates the vector distance threshold according to the historical distance vectors of the character images 6A2 to 6A6 stored in the storage spaces 601 to 605.

In operation S238, the matching character is outputted, but the matching character data is not updated. For example, when the processor 110 determines that the matching vector distance of the character image 6A6 is not less than the vector distance threshold, the processor 110 outputs the message that the character image 6A6 corresponds to the matching character A via the input and output circuit 150, but does not update the data of matching character A stored in the storage spaces 601 to 605. That is to say, the historical vector distances corresponding to the matching character A is still the historical vector distances of the originally stored character images 6A1 to 6A5.

In this case, after the processor 110 obtains the character image of the seventh frame of the matching character A at time point T7, the processor 110 calculates the vector distance threshold according to the historical vector distance of the historical character images 6A1 to 6A5 stored in the storage spaces 601 to 605.

In the above embodiments, the vector distance threshold is set to be calculated based on five historical vector distances. However, the embodiments of the present disclosure are not limited to five.

Reference is made to FIG. 1 again. In some embodiments, the processor 110 may be a server or other device. In some embodiments, the processor 110 may be a server, a circuit, a central processing unit (CPU), a micro-decoder (MCU) or other equivalent devices with the same or similar functions.

In some embodiments, the memory 130 may be an arithmetic circuit or element having functions of data storage, data transmission and reception, or similar functions. In some embodiments, the input and output circuit 150 may be an arithmetic circuit or element having data reading, reciting and receiving, or similar functions.

In some embodiments, the processor 110 and/or the memory 130 may be provided in a cloud server.

According to embodiments of the present disclosure, it is understood that the embodiments of the present disclosure provide a character recognition method, a character recognition device and a non-transitory computer readable medium, by storing the matching vector distance of each successfully paired image of character to be identified, and by providing the moving average method to the stored matching vector distance corresponding to the time (image of each frame), the value of the matching vector distance after using the moving average method is smoother than the matching vector distance of each successfully paired image of character to be identified, and the changing trend of the matching vector distance is still maintained. Therefore, the embodiments of the present disclosure use the moving average method to obtain the dynamic vector distance threshold updated by the data library. That is, the vector distance threshold changes dynamically over time to retain the same trend of image changes under the same matching character. In addition, when the vector distance threshold changes dynamically, the instantaneous transformation with too large difference is filtered out to reduce the subsequent misjudgment caused by the update of the contaminated matching vector to the data library.

Various functional elements are disclosed herein. To those of ordinary skill in the art, functional elements may be implemented by electrical circuits, whether it is a dedicated circuit, or a general-purpose circuit operating under the control of one or several processors and coded instructions.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A character recognition method, comprising:
   determining that an image of character to be identified corresponds to a matching character of a plurality of registered characters according to a plurality of vector distances to be identified between a vector of the image of character to be identified and a plurality of vectors of a plurality of registered character images of the plurality of registered characters, and storing a matching vector distance between the vector of the image of character to be identified and a vector of the matching character by a processor;
   calculating an average value of a plurality of historical vector distances of a plurality of historical character images of the matching character and multiplying the average value by a parameter to generate a vector distance threshold by the processor;
   updating a data of the matching character which is stored according to the image of character to be identified and updating the plurality of historical vector distances by storing the matching vector distance as one of the plurality of historical vector distances of the matching character when it is determined that the image of character to be identified corresponds to the matching character and the matching vector distance is less than the vector distance threshold by the processor; and
   not updating the data of the matching character which is stored and not updating the plurality of historical vector distances of the matching character when it is determined that the image of character to be identified corresponds to the matching character and the matching vector distance is not less than the vector distance threshold by the processor.

2. The character recognition method of claim 1, further comprising:
   replacing one of the plurality of historical vector distances by the matching vector distance when updating the data of the matching character.

3. The character recognition method of claim 1, further comprising:
   receiving a continuous image to be identified by the processor, and the image of character to be identified and the plurality of historical character images are obtained at different time points of the continuous image to be identified by the processor.

4. The character recognition method of claim 1, further comprising:
   storing the matching vector distance by the processor to update the data of the matching character when the matching vector distance is less than the vector distance threshold.

5. The character recognition method of claim 1, further comprising:
   outputting that the image of character to be identified is corresponding to the matching character by an input and output circuit.

6. The character recognition method of claim 1, further comprising:
   calculating the plurality of vector distances to be identified by the processor, and determining a smallest one of the plurality of vector distances to be identified; and
   when the smallest one of the plurality of vector distances to be identified is less than an identification threshold, determining that the image of character to be identified corresponds to the matching character of the plurality of registered characters by the processor, and the matching character corresponds to the smallest one of the plurality of vector distances to be identified.

7. The character recognition method of claim 6, further comprising:
   when the smallest one of the plurality of vector distances to be identified is not less than the identification threshold, determining the image of character to be identified does not correspond to the plurality of registered characters by the processor, and does not update data of the plurality of registered characters.

8. A character recognition device, comprising:
a memory, configured to store data of a plurality of registered characters; and
a processor, coupled to the memory, configured to:
determine that an image of character to be identified corresponds to a matching character of the plurality of registered characters according to a plurality of vector distances to be identified between a vector of the image of character to be identified and a plurality of vectors of a plurality of registered character images of the plurality of registered characters, and to store a matching vector distance between the vector of the image of character to be identified and a vector of the matching character;
calculate an average value of a plurality of historical vector distances of a plurality of historical character images of the matching character and multiply the average value by a parameter to generate a vector distance threshold;
update a data of the matching character which is stored according to the image of character to be identified and update the plurality of historical vector distances by storing the matching vector distance as one of the plurality of historical vector distances of the matching character when it is determined that the image of character to be identified corresponds to the matching character and the matching vector distance is less than the vector distance threshold; and
not to update the data of the matching character which is stored and not to update the plurality of historical vector distances of the matching character when it is determined that the image of character to be identified corresponds to the matching character and the matching vector distance is not less than the vector distance threshold.

9. The character recognition device of claim 8, wherein the processor is further configured to replace one of the plurality of historical vector distances by the matching vector distance when updating the data of the matching character.

10. The character recognition device of claim 8, wherein the processor is further configured to receive a continuous image to be identified, and the image of character to be identified and the plurality of historical character images are obtained at different time points of the continuous image to be identified by the processor.

11. The character recognition device of claim 8, wherein when the matching vector distance is less than the vector distance threshold, the processor is further configured to store the matching vector distance, so as to update the data of the matching character.

12. A non-transitory computer readable medium, configured to store a computer software and to perform a character recognition method, the character recognition method comprising:
according to a plurality of vector distances to be identified between a vector of an image of character to be identified and a plurality of vectors of a plurality of registered character images of a plurality of registered characters, determining that the image of character to be identified corresponds to a matching character of the plurality of registered characters, and storing a matching vector distance between the vector of the image of character to be identified and a vector of the matching character;
calculating an average value of a plurality of historical vector distances of a plurality of historical character images of the matching character, and multiplying the average value by a parameter to generate a vector distance threshold;
when it is determined that the image of character to be identified corresponds to the matching character and the matching vector distance is less than the vector distance threshold, updating a data of the matching character which is stored according to the image of character to be identified, and updating the plurality of historical vector distances by storing the matching vector distance as one of the plurality of historical vector distances of the matching character; and
when it is determined that the image of character to be identified corresponds to the matching character and the matching vector distance is not less than the vector distance threshold, not updating the data of the matching character which is stored, and not updating the plurality of historical vector distances of the matching character.

13. The non-transitory computer readable medium of claim 12, wherein the character recognition method further comprises:
when updating the data of the matching character, the matching vector distance replaces one of the plurality of historical vector distances.

14. The non-transitory computer readable medium of claim 12, wherein the character recognition method further comprises:
when the matching vector distance is less than the vector distance threshold, storing the matching vector distance by a processor, so as to update the data of the matching character.

* * * * *